United States Patent
Mello et al.

(10) Patent No.: US 9,950,389 B1
(45) Date of Patent: Apr. 24, 2018

(54) LASER CALIBRATION

(71) Applicant: EMC Corporation, Hopkinton, MA (US)

(72) Inventors: Brian J. Mello, Tewksbury, MA (US); Robert Walter McFadries, Ashburnham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 621 days.

(21) Appl. No.: 14/490,819

(22) Filed: Sep. 19, 2014

(51) Int. Cl.
| | |
|---|---|
| *B23K 26/362* | (2014.01) |
| *B23K 26/03* | (2006.01) |
| *B23K 26/04* | (2014.01) |
| *B23K 26/36* | (2014.01) |
| *G05B 19/18* | (2006.01) |

(52) U.S. Cl.
CPC .......... *B23K 26/032* (2013.01); *B23K 26/041* (2013.01); *B23K 26/365* (2013.01); *G05B 19/182* (2013.01); *G05B 2219/45041* (2013.01)

(58) Field of Classification Search
CPC ................... B23K 26/041; G05B 2219/45041
USPC ........................................................ 700/166
See application file for complete search history.

(56) References Cited

U.S. PATENT DOCUMENTS

| | | | | |
|---|---|---|---|---|
| 4,918,284 | A * | 4/1990 | Weisz | B23K 26/042 219/121.69 |
| 5,304,773 | A * | 4/1994 | Kilian | B23K 26/04 219/121.78 |
| 6,808,117 | B2 | 10/2004 | Han et al. | |
| 6,894,794 | B1 * | 5/2005 | Patton | H04N 1/32144 358/1.15 |
| 7,015,418 | B2 | 3/2006 | Cahill et al. | |
| 2003/0202092 | A1 * | 10/2003 | Sadighi | B25J 9/1692 348/87 |
| 2014/0320868 | A1 * | 10/2014 | Shaked | B41J 11/008 358/1.2 |

FOREIGN PATENT DOCUMENTS

WO 03092069 A1 11/2003

OTHER PUBLICATIONS

Hewlett-Packard Development Company, L.P.., "Understanding "dpi"" Feb. 2010. 4 pages.*

* cited by examiner

*Primary Examiner* — Emilio J Saavedra
(74) *Attorney, Agent, or Firm* — BainwoodHuang (57) ABSTRACT

An improved technique for calibrating the location of an individualized marking includes marking both a grid and an image on a calibration object. The technique uses the marked grid to measure the distance in two orthogonal directions from the current image location to the desired image location by counting the number of grids between the current image location to the desired image location.

17 Claims, 5 Drawing Sheets

LASER CALIBRATION

BACKGROUND

Some objects have individualized markings that distinguish them from other similar objects. For example, a secure token that generates one-time passwords (OTPs) has a serial number etched into its surface by which it may be uniquely identified.

One approach to providing an individualized marking to an object involves laser etching the marking in the object. In such an approach, a laser such as a carbon dioxide laser with sufficient power to burn a hole in the object's surface irradiates a template of the marking on a portion of the object. An operator may control the direction of the laser radiation so that the laser burns the marking in an expected place on the object. For example, when the laser is etching a serial number on a token, the operator may aim the laser so that the number is etched below a display of the OTP.

When many similar objects each require individual markings via laser etching, the orientation of the laser involved may require calibration. Conventional approaches to calibrating the orientation and position of an etching laser involve manual measurement of a deviation from the desired location of a test mark on a calibration object. For example, the laser etches the marking on the calibration object at a current position. An operator then observes the difference in position between the current position and the intended position. The operator then uses the difference to adjust the orientation of the laser. The difference may be determined by an estimation of the misalignment distance.

SUMMARY

Unfortunately, there are deficiencies with the above-described conventional approach of calibrating the orientation of an etching laser. For example, manual measurement of the deviation is tedious and error-prone. In cases such as providing serial numbers for secure tokens, such approaches may limit throughput and raise manufacturing costs.

In contrast to the conventional approaches for calibrating the direction of an etching laser, and thus the location of a laser mark, improved techniques involve projecting and marking a grid on an object during calibration as well as marking an image. Such techniques use the marked grid to count the distance in two orthogonal directions (i.e., X and Y) to correct the misalignment of the laser mark with respect to the desired mark location. The laser mark may also be rotated with respect to the desired mark location as well as being misaligned in the X and Y direction and an angular correct may be needed.

One embodiment of the improved technique is directed to a method of laser marking an object. The method includes transmitting first instructions to a laser marking device to mark both a grid pattern and an image within the grid pattern on a calibration object held in a marking fixture. The calibration object may be used to show the marked image located at a current position within the grid pattern according to the current configuration of the laser marking device, and may be the starting point for determining a differential position used to shift the laser to the desired location. The method also includes receiving a differential position by which the image is to be shifted within the grid pattern. The differential position may be the difference between the current position of the image within the grid pattern and a desired position of the image on the calibration object. The method further includes transmitting second instructions to the laser marking device to change the configuration of the laser marking device to cause the laser marking device to mark the image according to the differential position (i.e., moving the mark toward the desired location).

Other embodiments of the improved technique are directed to a laser marking device. The laser marking device includes a laser, a marking fixture in a fixed position relative to the laser, and a controller in communication with the laser. The controller is constructed and arranged to transmit first instructions to mark a grid pattern and an image on a calibration object held in the marking fixture. The controller is further constructed and arranged to receive a differential position by which the image is to be shifted within the grid pattern. The controller is further constructed and arranged to transmit second instructions to the laser to change the current configuration of the laser marking device to a new configuration. The new configuration causes the laser marking device to mark the image according to the differential position. The laser marking device may include a camera to form a picture of the grid pattern and the marked image on the object. The controller may determine a desired location of the image on the calibration object and count a number of grid lines between the current position of the marked image in the marked grid pattern and the desired position of the image on the calibration object to form the differential position.

Furthermore, other embodiments of the improved technique are directed to a computer program product having a non-transitory computer readable medium storing a set of instructions which, when executed in a computer, cause the computer to perform the method of laser marking an object.

Advantageously, applying the improved methods and apparatus improves the accuracy and speed of calibrating laser marking devices. An improved technique for calibrating a laser making device includes marking a grid and an image on a calibration object, and using the marked grid to measure an offset distance by counting grids in two orthogonal directions to correct the location of the marked image versus the desired location of the mark. The technique provides a fast, inexpensive and accurate method to calibrate a laser marking system. The use of the grid enables automatic machine vision offset measurements and differential position calculations, and improves accuracy over human measurement. The grid also enables individual adjustment for separate portions of an image. For example, an image that is rotated relative to a desired orientation may use the grid to calculate a separate offset value for opposite ends of an image, thereby including a rotation correction.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique for calibrating the location of an individualized marking includes marking both a grid and an image on a calibration object. The technique uses the marked grid to measure the distance from the current image location to the desired image location by counting the number of grids between the current image location to the desired image location.

Figure 1:
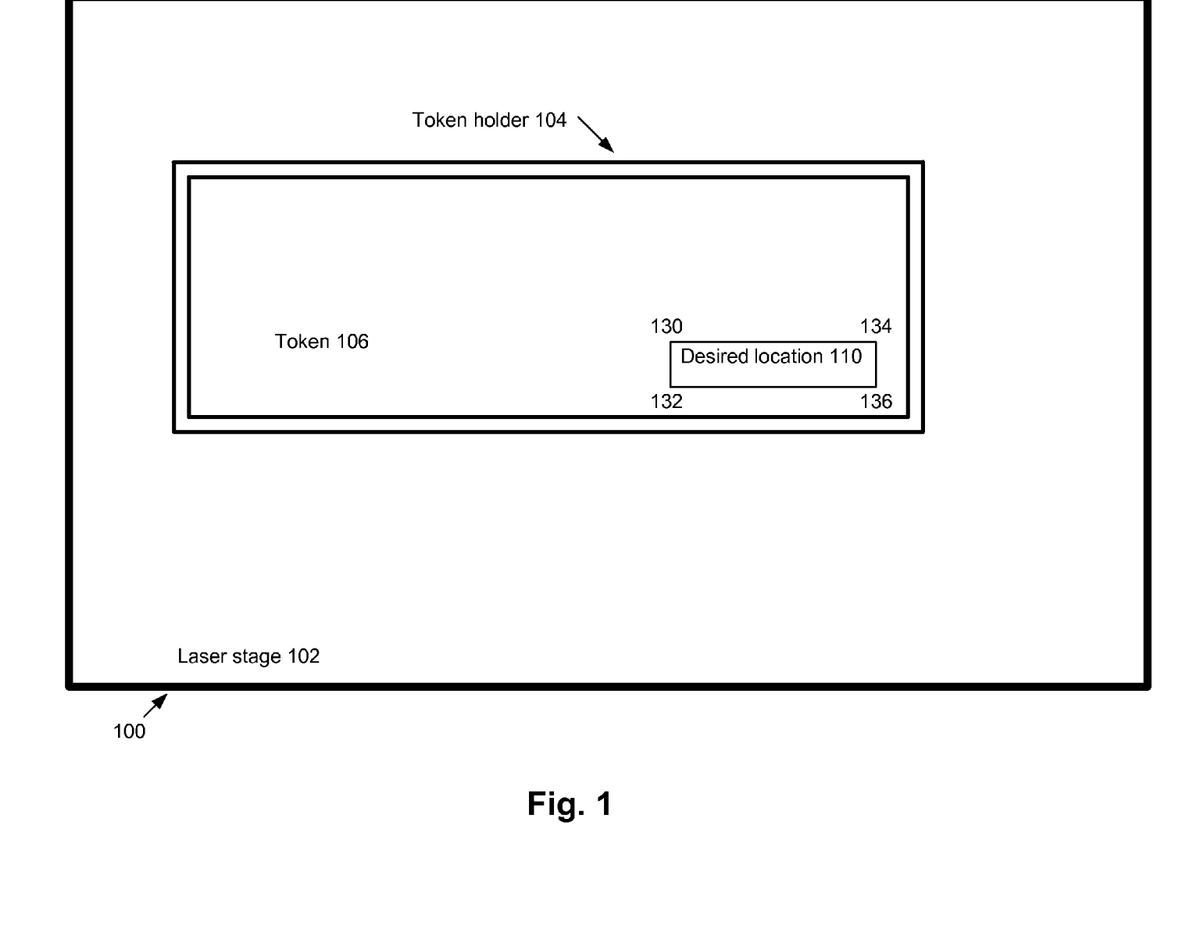
FIG. 1 is a block diagram illustrating an object to be laser marked and a desired location for the mark.

FIG. 1 is a block diagram illustrating an object to be laser marked and a desired location for the mark. FIG. 1 presents an illustrative example of individualized laser marking of an object such as an OTP token. FIG. 1 includes a portion of a laser marking device 100 having a laser stage 102 supporting a token holder 104. The token holder 104 holds a token 106 in a relatively fixed position with respect to a laser (not shown). As an example of a token holder, a recess in the token holder 104 may be sized and shaped to hold a specific type of token 106. It should be noted that a laser used for etching may have a directionally controlled laser beam to burn holes or lines in heat sensitive materials (such as plastic) to create words, numbers, symbols or images. The type of laser used may be a carbon dioxide laser or any sufficiently powerful laser that can change the properties of a material and leave a readable mark on the object.

The token 106 is shown in FIG. 1 as being rectangular in shape, but any shape token may be used with an appropriate token holder. The token 106 may have a specific desired location 110 for the individualized mark. An example of an individualized mark is a serial number.

The desired location to individually mark an object may be indicated by a raised area, or by an indented area on the token, or other known methods. The desired location 110 may have a specified shape, such as the rectangular shape shown having ninety degree corners indicated by 130, 132, 134 and 136. Alternatively, the desired location 110 may not include any special indication and may be defined by a set of distance and direction pair values from an origin point. An example of a suitable origin point for indicating the desired area location may be one or more of the corners of the token holder 104.

Marking objects with various individualized markings, such as a serial number, an identification symbol, a brand mark or a personal decorative marking, may be useful in identifying objects. While there are many conventional methods of providing markings, such as stamping, pressing and etching, many of these methods are slow and costly when used for individualized markings. A computer controlled laser device may be useful for individualized marking of objects. However, the laser beam position on the object is controlled by an array of moving mirrors and mechanisms, and there are many ways in which a laser beam may be accidently moved away from a desired marking location. A calibration procedure may then be needed to correct the laser beam location.

The calibration procedure may simply include marking a test object and either guessing or using a measuring device such as ruler to measure the distance from the currently marked location to the desired location may result in erroneous distance measurements. This type of procedure may result in numerous iterations of marking, observing and correcting, and consequent increased calibration object expense and reduced production rates.

In addition, such manual methods of misalignment measurement and correction may result in a vector value that includes a distance and an angle. The measured distance and angle may then need to be converted to scalar values (e.g., in the X and in the Y directions) by calculations in order to provide appropriate instructions to the laser marker device. This type of manual approach to measuring an offset for calibrating a mark location also does not provide a simple means to measure mark rotation relative to the desired location orientation, as well as being inaccurate, time consuming and expensive.

Figure 2:
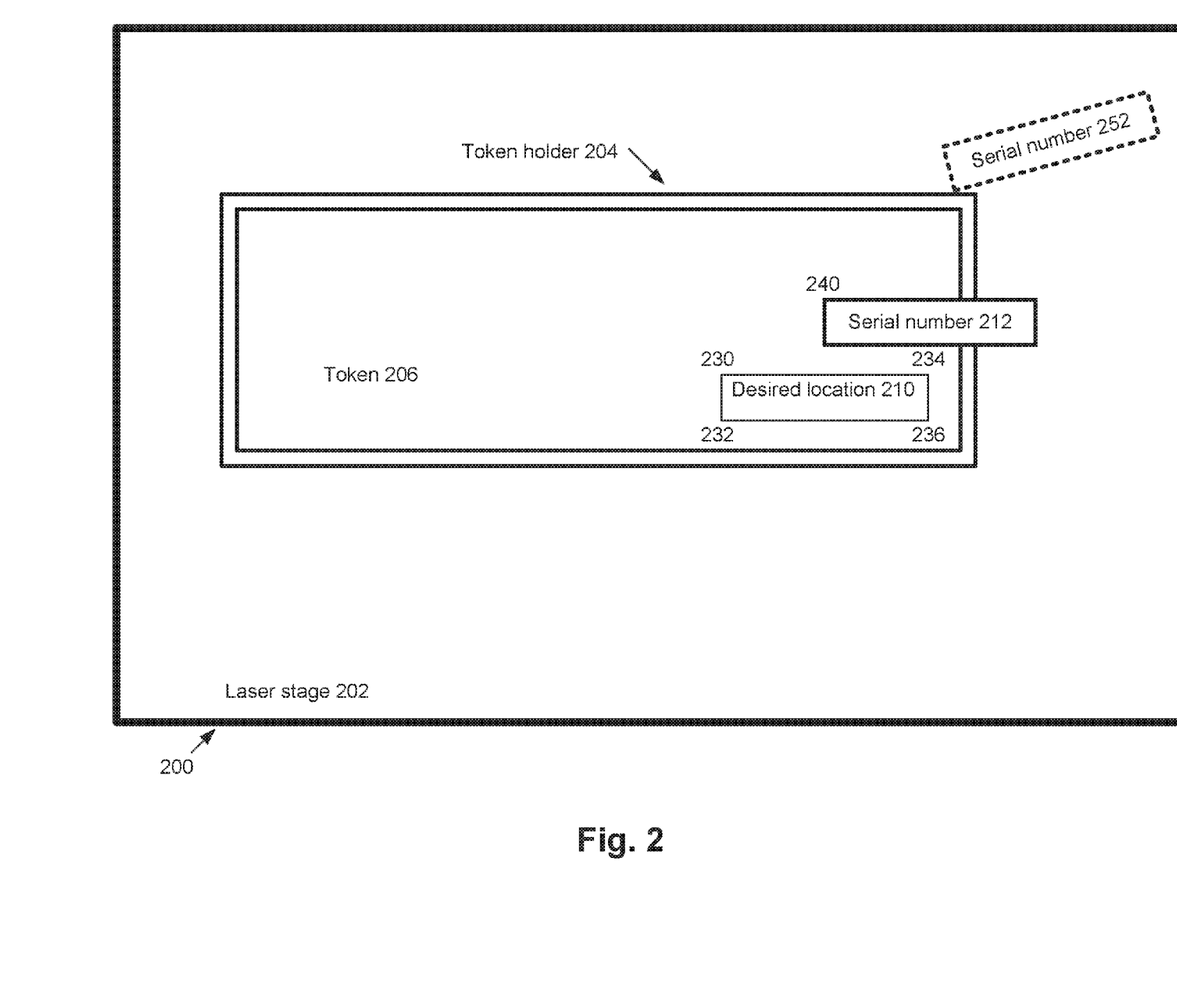
FIG. 2 is a block diagram illustrating an object to be laser marked and a marked serial number.

FIG. 2 is a block diagram illustrating an object to be laser marked and a marked serial number to reflect a potential issue with conventional approaches to individualized object marking. In FIG. 2 the token 206 has been marked by a laser marking system resulting in an individualized mark, in this example a serial number 212.

For any of many known reasons the alignment of the marking system with respect to the token 206 has in this case resulted in the serial number 212 being misaligned with respect to the desired location 210. The desired location 210 is shown with corners, 230, 232, 234, and 236. In FIG. 2 the mark 212 is misaligned to the right and above the desired location 210 and the mark has a long axis that is parallel to a long axis of the desired location 210. This may not always be the case and a mark such as serial number 252 may have a rotational misalignment as well as a positional misalignment.

Conventional approaches to correcting a misaligned marking may involve removing the token 206 from the token holder 204 and determining an offset of the serial number 212 by estimation, or using a measuring device such as a ruler or a caliper. For example, a person might measure the distance from the upper left corner 240 of the serial number 212 to the upper left corner 230 of the desired location 210, resulting in a measured distance. However a distance alone does not provide enough information to determine the instructions which need to be sent to the laser marking device controller to calibrate the mark location correctly. In addition to a measured distance between the location of serial number 212 and the desired location 210, an angle is needed to provide an unambiguous offset shift. Such an angle may be determined by estimation, or by the use of an instrument such as a protractor.

An additional issue with the accuracy of mark placement with the conventional approach occurs if the mark is also rotated with respect to the desired location (i.e. the long axis of serial number 212 may not be horizontal as shown) as shown in FIG. 2 by serial number 252. In such a situation the conventional approach may determine an angular rotation correction of serial number 252 by estimation, or by the use of protractor.

Figure 3:
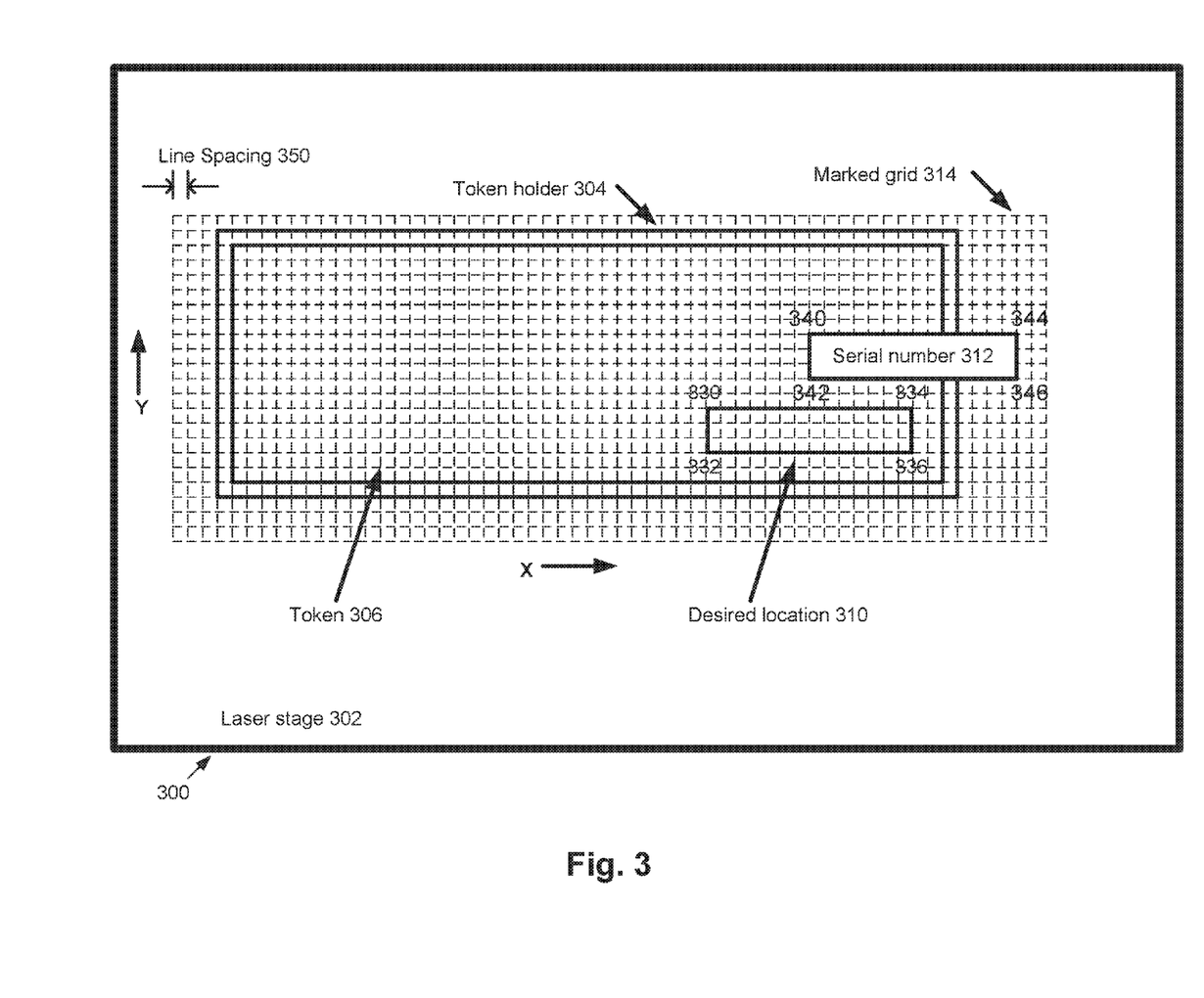
FIG. 3 is a block diagram illustrating an object to be laser marked and a grid to be marked with a marked serial number.

FIG. 3 is a block diagram illustrating an object to be laser marked and a grid to be marked on a calibration object (i.e., token 306). Token 306 is held in an object holder (i.e., token holder 304) on a laser stage 302, which is a portion of a laser marking device 300. A serial number 312 has been marked on the token 306 in response to first instructions from a controller. A grid 314 is also marked on the token 306, typically at the same time as the serial number 312. It should be noted that the figure shows a marked grid 314 having an extent that is greater than the token 306, but the method is not so limited, and any size grid pattern may be used. The grid extent may be determined based upon past results indicating a probable average marking deviation away from the desired location 310, and may exceed the edge of token 306 if needed (as shown).

In the illustrated situation the serial number 312 is misaligned to the upper right of the desired location 310, and has an orientation that is parallel to the desired location. Thus, the differential position may be determined by counting a number of grids in the X direction to between a lower left hand corner 342 of serial number 312 and a lower left hand corner 332 of the desired location 310. In FIG. 3 the number of grids the serial number 312 must be moved to match the desired location 310 may be determined to be seven grids to the left (i.e., minus 7 in the X direction) and five grids down (i.e., minus 5 in the Y direction). The differential position may be determined by visually counting by naked eye, under magnification, or by use of machine vision automatic counters.

The magnitude of the line to line spacing 350 in the marked grid 314 may be determined by the desired accuracy, and the spacing may be different for the X and Y directions. For OTP tokens, such as shown in the figures, a line to line spacing of 0.5 millimeters may be selected, but the spacing may be selected as appropriate for the desired accuracy of marking placement in the desired location 310. It should also be noted that although the shown grid uses orthogonal lines, the method is not so limited and any sort of measuring method may be used, such as hexagonal shapes, crosses and dots.

The differential position is used by an operator or a controller to adjust the positioning of the laser to place the serial number 312 in the desired location 310 by means of second instructions to the laser marking system. The differential position is the difference between the current position of the image within the grid pattern and the desired position of the image on the calibration object. Obtaining the differential position may involve the controller receiving an image or a photograph of the marked image in the marked grid pattern. The controller may automatically identify the desired location 310 of the marked image serial number 312 and count a number of grid lines between the current position of the marked image in the marked grid pattern 314 and the desired location 310 of the image to form the differential position to shift the image.

The controller may identify the desired location 310 using a first set of alignment points on the calibration object. For example the corners 330, 332, 334 and 336 of the desired location 310 may be raised, or identified with features such as etched dots or crosses. The controller may then count the number of etched grid lines in both the X and Y directions to find the desired correction value. For example, the controller may count the number of grid lines from an alignment point on the marked image, for example 340 of FIG. 3 (or another point related to corner 312, such as 342, 344, or 346), to a respective alignment point such as 330 at the desired location 310. The controller may then use the number of grids counted to send second instructions to the laser to shift the location of serial number 312 to the desired location 310.

In other embodiments, the differential position may be formed by use of two or more individual differentials. Each individual differential may be from a different portion of the marked image and the respective portion of the desired location. For example, a first differential may be formed from the top left corner 340 of the serial number 312 to the top left corner 330 of the desired location 310. A second differential may be formed from the lower right hand corner 346 of the serial number 312 to the lower right hand corner 336 of the desired location 310. The differential position is then a combination of the first and second differentials, and includes a correction for any mark rotation.

Figure 4:
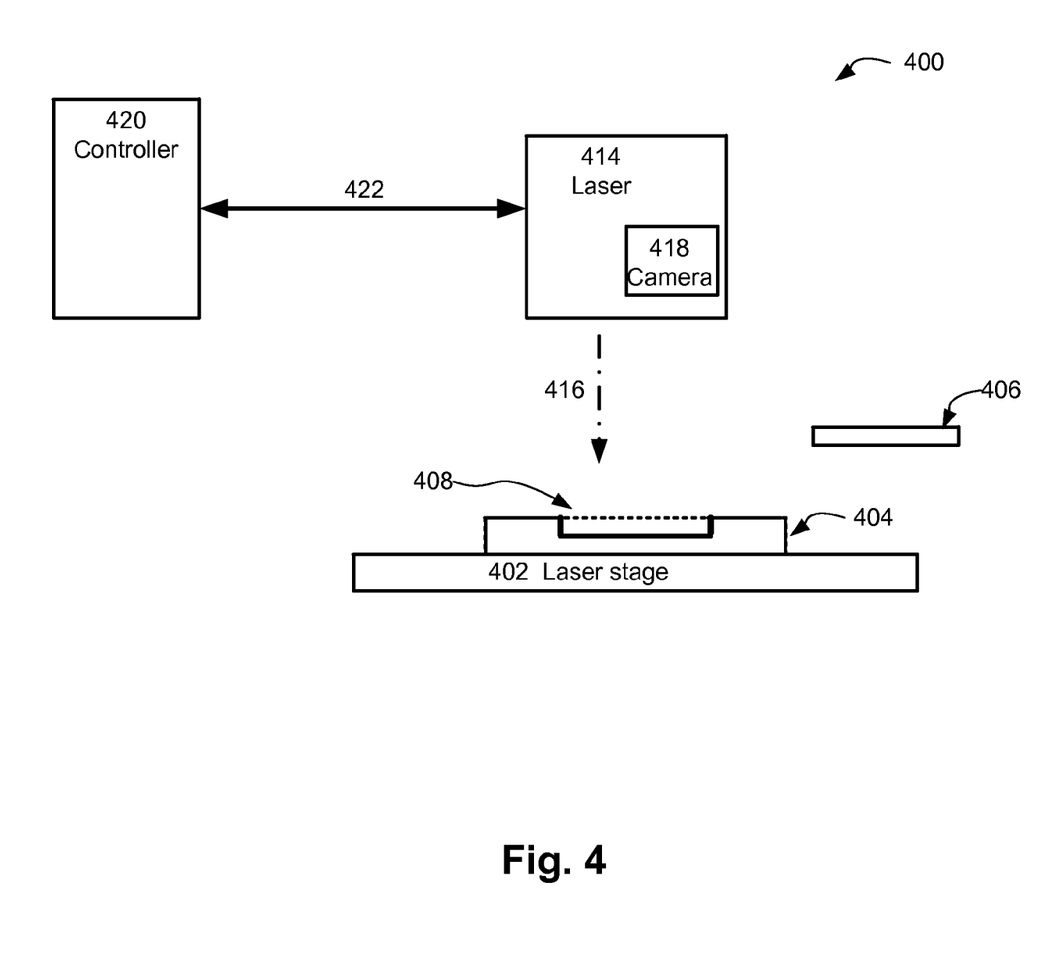
FIG. 4 is a block diagram illustrating the components of a laser marking device and an object to be marked.

FIG. 4 is a side view block diagram illustrating the components of a laser marking device 400 and an object 406 to be marked. A laser stage 402 supports a token holder 404 for positioning a token 406 for laser marking. The token holder 404 may have a depression 408 which is sized and shaped appropriately for securing holding the token 406. Other forms of token holding may be used as appropriate for the shape and size of the object to be marked and may include raised projections and corner angles, or no holder at all.

The laser stage 402 is positioned relative to a laser 414 of a laser marking device which directs a laser beam 416 in a pattern transmitted by a controller 420 to the laser 414 via bidirectional communications link 422. There may also be a camera 418 positioned to form an image of the laser mark on token 406. The camera 418 may be located on the laser 414, as part of laser 414, or any position providing a view of the marking area.

Figure 5:
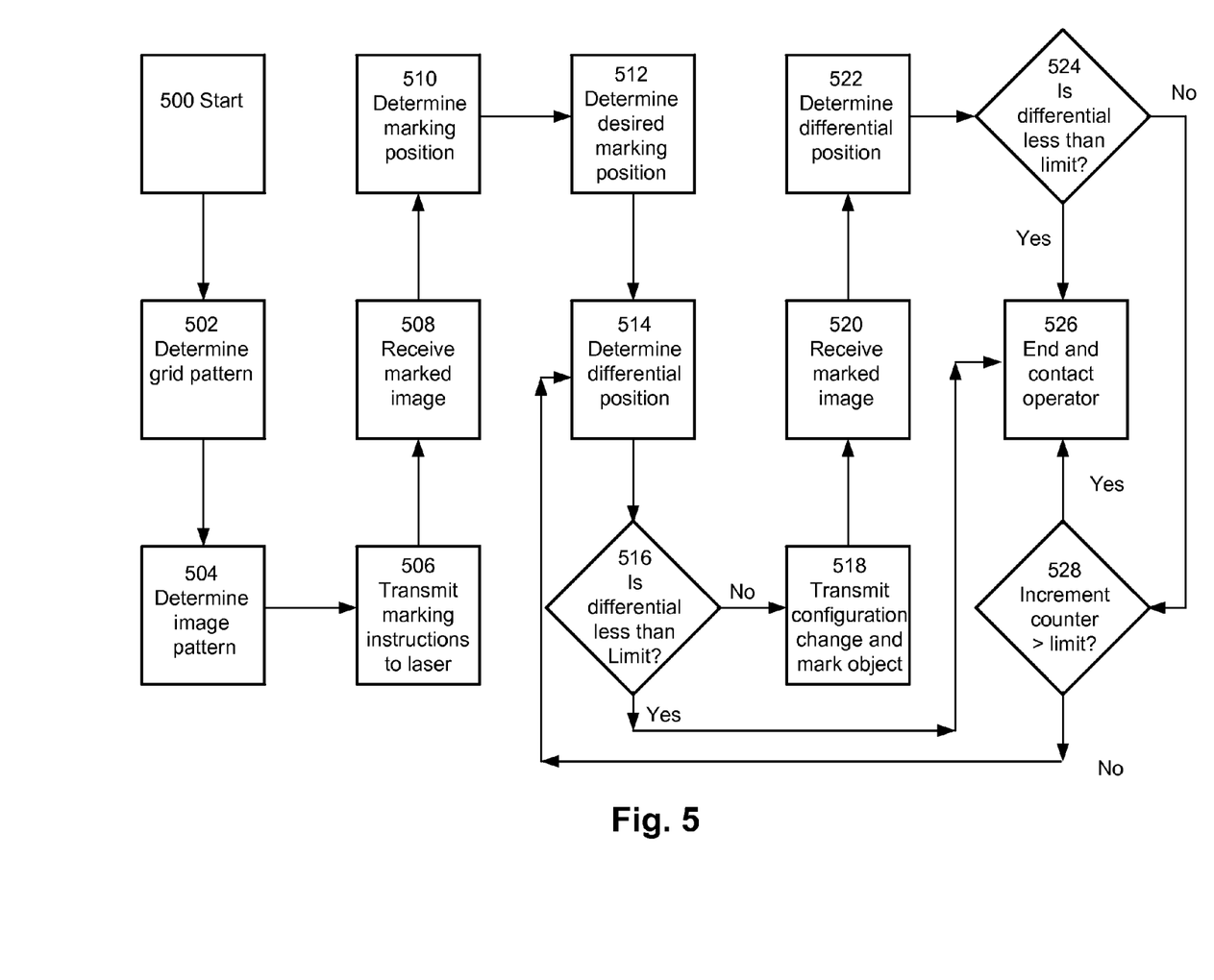
FIG. 5 is a flowchart illustrating a method of carrying out the improved technique.

FIG. 5 is a flowchart illustrating a method of carrying out the improved technique. At step 500 the method is initiated and starts in controller 420. At step 502 the line to line spacing 350 of the grid is determined and the extent of the grid is determined, for example by consideration of the past history of the variations of the laser location, the size of the object to be marked, the linear dimensions of the mark, the desired accuracy of mark placement, and other features of the marking.

At step 504 the specific individualized marking, such as a serial number 312, is determined, and at step 506 the controller 420 transmits, via communications link 422, a first set of instructions to the laser 414. At step 508 the laser 414 receives the instructions from the controller and marks the token 406 with the grid pattern and the image. In some embodiments, the camera 418 transmits a picture of the marked image and grid to the controller 420. In other embodiments the controller 420 receives a differential position.

At step 510 the controller 420 may use the picture to determine the location of the marked image. For example, the controller might identify the edges of the marking such as locations 340-346 of FIG. 3. At step 512 the controller 420 may use the picture to determine the location of the desired marking location. For example, the controller 420 might identify raised corners of the desired location such as locations 330, 332 and 336 of FIG. 3.

At step 514 the controller 420 may determine the differential position indicating the difference between the serial number 312 and the desired location 310. This may be performed by the controller using edge finding software, and counting the number of grids in both the X and Y directions to overlay the corner 340 of the serial number 312 with the corner 330 of the desired location 310.

Alternatively, the differential position may be formed by use of two or more differentials, each from a different portion of the marked image and the respective portion of the desired location. For example, a first differential may be formed from the top left corner 340 to the top left corner of the desired location 330. A second differential may be formed from the lower right hand corner 346 to the lower right hand corner 336 of the desired location. The differential position would then be the combination of both first and second differentials and thus include correction for possible rotation of the marked serial number 312.

At step 516 the controller 420 determines if the differential position is less than a limit. If the differential position is less than a stored limit value the method ends at step 526. If the differential position is greater than the limit value the method moves to step 518.

At step 518 the controller 420 transmits a second set of instructions to the laser 414 to shift the location of the marking in accordance with the differential position and transmits an instruction to mark another object, such as another token 306. The second set of instructions is intended to move the serial number 312 into the calibrated correct position within the boundary of the desired location 310, and mark a new object with the shifted image.

At step 520 the controller 420 may receive another picture of the newly marked image, and at step 522 the controller repeats the steps of determining a differential position. At step 524 the controller determines if the second differential position is less than a limit. If the differential position is less than a limit value the method ends at step 526 with a notice to an operator. If the differential position is greater than the limit the method increments a counter and moves to step 528.

At step 528 the controller 420 determines if the counter has exceeded a limit. If the counter is less than the limit the method moves back to step 514 and repeats the method until the differential position is less than the limit or until a number of iterations exceed the limit. If the counter is greater than the limit the method moves to step 526 and ends with a notice to the operator.

With such an arrangement the calibration of a laser marking system may have improved speed and accuracy, and may be able to replace some human activity with direct computer measurements and control.

In general the described method and apparatus involves marking both a grid and an image on an object. The grid enables either easy human determination of a shift needed to move the image into the desired location or machine vision determination of the desired shift. Typically, the grid would be sized to cover the desired location of the image, but known historical variations of the initial location of the laser might result in selecting the entirety of the top surface of the calibration object as the extent of the grid pattern. The grid may even include portions of the token holder and laser stage to ensure that the grid includes the desired location on the object to be marked.

While various embodiments of the invention have been particularly shown and described, it will be understood by those skilled in the art that various changes in form and details may be made therein without departing from the spirit and scope of the invention as defined by the appended claims.

Furthermore, it should be understood that some embodiments are directed to controller 420, which is constructed and arranged to transfer information to and from a laser marking device. Some embodiments are directed to a laser marking device 414. Also, some embodiments are directed to a computer program product that enables computer logic to cause a computer to transfer instructions to a laser marking device.

In some arrangements, controller 420 is implemented by a set of cores or other types of control/processing circuitry running software. In such arrangements, the software instructions can be either in the form of a computer program product, or simply instructions on disk or pre-loaded in the memory of controller 420 or laser marking device 420, the computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of laser marking an object, the method comprising:

transmitting, by a computing device, first instructions to a laser marking device, the first instructions being configured to cause the laser marking device to mark, using a laser, i) a grid pattern on a calibration object held in a marking fixture, and ii) an image within the grid pattern, the image being located at a current position within the grid pattern according to a current configuration of the laser marking device;

receiving, by the computing device, a differential position by which the image is to be shifted within the grid pattern, the differential position being a difference between the current position of the image within the grid pattern and a desired position of the image on the calibration object;

and transmitting, by the computing device, second instructions to the laser marking device, the second instructions being configured to change the current configuration of the laser marking device to a new configuration, the new configuration causing the laser marking device to mark the image using the laser according to the differential position;

wherein receiving the differential position further includes:

receiving a picture of the marked image in the marked grid pattern on the calibration object;

identifying the desired position of the marked image in the marked grid pattern on the calibration object in the received picture;

and counting a number of grid lines between the current position of the marked image in the marked grid pattern and the desired position of the image on the calibration object to form the differential position by which the image is to be shifted within the grid pattern.

2. The method of claim 1, wherein identifying the desired position of the marked image on the calibration object in the received picture includes identifying a first set of alignment points on the calibration object; and wherein counting the number of grid lines includes counting the number of grid lines from at least one alignment point of a second set of alignment points on the marked image to a respective alignment point of the first set of alignment points.

3. The method of claim 2, wherein:

the first set of alignment points on the calibration object includes a set of four corners on a raised portion of the calibration object;

the second set of alignment points includes a set of four points located near corners of the marked image; and forming the differential position includes forming:

a first differential for a first portion of the marked image, including counting a first number of grid lines between the current position of a first one of the second set of alignment points on the marked image and a respective one of the first set of alignment points of the desired position on the calibration object; a second differential for a second portion of the marked image, including counting a second number of grid lines between the current position of a second one of the second set of alignment points on the marked image and a respective one of the first set of alignment points on the calibration object; and combining the first differential and the second differential to form a combined differential position including angular correction.

4. The method of claim 1, wherein receiving the picture of the marked image in the marked grid pattern on the calibration object includes transmitting instructions to the laser marking device for taking a photograph of the marked image, and transmitting the photograph to the computing device.

5. The method of claim 1, wherein the first instructions include instructions to mark the grid pattern on an entirety of a top surface of the calibration object, the grid pattern including two sets of orthogonal lines, each set of lines having a selected line to line spacing.

6. The method of claim 5, wherein the selected line to line spacing includes a range of from 1-2 millimeters.

7. A laser marking device, comprising:
a laser enabled and controlled to mark an object;
a marking fixture in a fixed position relative to the laser;
a controller in communication with the laser, the controller constructed and enabled to:
transmit first instructions to the laser to mark a grid pattern and an image within the grid pattern on a calibration object held in the marking fixture;
receive a differential position by which the image is to be shifted within the grid pattern; and
transmit second instructions to the laser to change the current configuration of the laser marking device to a new configuration, the new configuration causing the laser marking device to mark the image according to the differential position; and
a camera constructed and enabled to form a picture of the grid pattern and the marked image;
wherein the controller is constructed and enabled to:
instruct the camera to take a picture of the marked image and transmit the picture to the controller;
determine that the marked image is located at a current position within the grid pattern according to a current configuration of the laser marking device;
determine a desired location of the image on the calibration object; and
count a number of grid lines between the current position of the marked image in the marked grid pattern and the desired position of the image on the calibration object, to form the differential position.

8. The laser marking device of claim 7, wherein the desired position of the marked image on the calibration object in the received picture includes a first set of alignment points on the calibration object; and
the number of grid lines counted includes the number of grid lines from at least one of a second set of alignment points on the marked image to at least one respective one of the first set of alignment points.

9. The laser marking device of claim 8, wherein the first set of alignment points on the calibration object includes a set of four corners on a raised portion of the calibration object;
the second set of alignment points includes a set of four points located near corners of the marked image; and
the differential position includes:
a first differential for a first portion of the marked image, including a first number of grid lines between the current position of a first one of the second set of alignment points on the marked image and a respective one of the first set of alignment points of the desired position on the calibration object;
a second differential for a second portion of the marked image, including a second number of grid lines between the current position of a second one of the second set of alignment points on the marked image and a respective one of the first set of alignment points on the calibration object; and
wherein the first differential and the second differential combine to form a differential position including angular correction.

10. The laser marking device of claim 7, wherein the first instructions include instructions to mark the grid pattern on an entirety of a top surface of the calibration object, the grid pattern including two sets of orthogonal lines, each set of lines having a selected line to line spacing.

11. The laser marking device of claim 10, wherein the controller further being constructed and enabled to determine that the marked image is located beyond the marked grid pattern and to instruct the laser to extend the grid pattern to beyond the determined location of the marked image.

12. A computer program product comprising a non-transitory computer readable medium, wherein the medium stores a set of instructions which when executed in a computer, cause the computer to perform a method of laser marking an object, the method comprising:
transmitting, by a computing device, first instructions to a laser marking device, the first instructions being configured to cause the laser marking device to mark, using a laser, i) a grid pattern on a calibration object held in a marking fixture, and ii) an image within the grid pattern, the image being located at a current position within the grid pattern according to a current configuration of the laser marking device;
receiving, by the computing device, a differential position by which the image is to be shifted within the grid pattern, the differential position being a difference between the current position of the image within the grid pattern and a desired position of the image on the calibration object;
and
transmitting, by the computing device, second instructions to the laser marking device, the second instructions being configured to change the current configuration of the laser marking device to a new configuration, the new configuration causing the laser marking device to mark the image using the laser according to the differential position;
wherein receiving the differential position further includes:
receiving an picture of the marked image in the marked grid pattern on the calibration object;
identifying, by the computing device, the desired position of the marked image in the marked grid pattern on the calibration object in the received picture;
and
counting, by the computing device, a number of grid lines between the current position of the marked image in the marked grid pattern and the desired position of the image on the calibration object to form the differential position by which the image is to be shifted within the grid pattern.

13. The computer program product of claim 12, wherein identifying the desired position of the marked image on the calibration object in the received picture includes identifying, by the computing device, a first set of alignment points on the calibration object; and counting the number of grid lines includes counting the number of grid lines from a second set of alignment points on the marked image to respective ones of the first set of alignment points on the calibration object.

14. The computer program product of claim 13, wherein:

the first set of alignment points on the calibration object includes a set of four corners on a raised portion of the calibration object;

the second set of alignment points includes a set of four points located near corners of the marked image; and forming the differential position includes forming:

a first differential for a first portion of the marked image, including counting a first number of grid lines between the current position of a first one of the second set of alignment points on the marked image and a respective one of the first set of alignment points of the desired position on the calibration object;

a second differential for a second portion of the marked image, including counting a second number of grid lines between the current position of as second one of the second set of alignment points on the marked image and a respective one of the first set of alignment points on the calibration object; and combining the first differential and the second differential to form a combined differential position including angular correction.

15. The computer program product of claim 12, wherein receiving the picture of the marked image in the marked grid pattern on the calibration object includes taking, by a camera, a photograph of the marked image, and transmitting the photograph to the computing device.

16. The computer program product of claim 12, wherein the first instructions include instructions to mark the grid pattern on an entirety of a top surface of the calibration object, the grid pattern including two sets of orthogonal lines, each set of lines having a selected line to line spacing.

17. The method of claim 1, wherein the method further includes, after transmitting the second instructions to the laser marking device:

removing the calibration object from the marking fixture;

placing a second object in the marking fixture; and repeating execution of the second instructions with the second object in the marking fixture, thus causing the laser marking device to mark the second object with the grid pattern and with a second image within the grid pattern, the second image marked near a desired position on the second object.

* * * * *